United States Patent
Brown

Patent Number: 5,279,027
Date of Patent: Jan. 18, 1994

[54] APPARATUS FOR ATTACHING ROTORS TO CRANKSHAFTS

[75] Inventor: Alan M. Brown, Liverpool, N.Y.

[73] Assignee: Carrier Corporation, Syracuse, N.Y.

[21] Appl. No.: 519,695

[22] Filed: May 4, 1990

[51] Int. Cl.[5] .............................................. H02K 15/02
[52] U.S. Cl. ..................................... 29/732; 29/598; 29/800
[58] Field of Search ................ 29/598, 447, 800, 732, 29/736

[56] References Cited

U.S. PATENT DOCUMENTS

| | | | |
|---|---|---|---|
| 2,145,864 | 2/1939 | Denneen et al. | 29/447 |
| 3,345,732 | 10/1967 | Brower | 29/447 |
| 4,729,160 | 3/1988 | Brown | 29/598 |

*Primary Examiner*—Carl E. Hall

[57] ABSTRACT

An internal induction coil is used to heat the rotor of an ECM. This provides a localized heating and dilation of the bore of the rotor prior to the heating of the outer surface of the rotor. The crankshaft is located in the heated bore and acts as a heat sink. As a result, the outer surface of the rotor is not heated such as might cause the loss of magnetic properties.

5 Claims, 2 Drawing Sheets

APPARATUS FOR ATTACHING ROTORS TO CRANKSHAFTS

BACKGROUND OF THE INVENTION

As disclosed in U.S. Pat. No. 4,876,492, an electronically commutated motor, ECM, includes a permanent magnet rotor assembly. The rotor assembly has a low reluctance core formed as an annular cylindrical ferromagnetic member generally referred to as backbone. The backiron is surrounded by a number of thin flat angular ferromagnetic elements or laminations secured to the outer peripheral surface of the backiron so as to establish constant magnetic polar regions with north-south polarizations. The thin ferromagnetic elements are made of permanent magnetic material such as Alnico and are secured, as by adhesive bonding, to the backiron. The thin ferromagnetic elements are alternately polarized to provide constant magnetic polar regions.

Where a rotor is to be directly attached to a crankshaft, or the like, it is common practice to heat the rotor and place it on the crankshaft so as to be shrunk fit thereon upon the cooling of the rotor. Ferromagnetic materials, however, are subject to the loss of their magnetic properties when heated to their Currie temperature. As a result, it is conventional to secure the rotors of ECM's by slot and key or other suitable means other than shrink fitting. Where one member is attached to another by shrink fitting, it is conventional to heat one of the members by an external induction coil or to place it in a convection oven to cause its thermal expansion. The heated member is placed on the other member and allowed to cool to a shrink fit. In such a method, the heated member is heated as a unit since the interior bore must be thermally expanded.

SUMMARY OF THE INVENTION

The present invention is directed to a method and apparatus for securing members together by a shrink fit. The invention is particularly applicable for securing the rotor of an ECM to a crankshaft, but is advantageous in any shrink fitting operation where one member is heated to permit its attachment to another member. Specifically, the present invention uses an induction coil to provide a localized heating and expansion of one member which can then be placed over or receive the other member to which it is to be shrink fit. Because the heating is localized, less energy is required, the ECM rotor magnets are not destroyed, there are no problems due to differential heating of dissimilar materials, the external surface remains cool and can be handled without the use of special tools. Further, because the core is heated by conduction between its middle and outside surface, thermal stresses are minimized since the crankshaft acts as a heat sink upon assembly.

It is an object of this invention to provide a method and apparatus for securing the rotor of an ECM to a crankshaft by shrink fit.

It is another object of this invention to provide a method and apparatus for the localized heating of a member.

It is a further object of this invention to provide a method and apparatus for heating the rotor of an ECM without the loss of magnetic properties.

It is an additional object of this invention to provide an energy efficient method and apparatus for securing members by shrink fit. These objects, and others as will become apparent hereinafter, are accomplished by the present invention.

Basically, an induction coil is placed in a bore or aperture in a member and then energized. Inductive penetration and heating takes place within a finite radial distance from the coil with heating by conduction taking place in the portion of the member at a greater radial distance then the inductive penetration. When the material surrounding the bore or aperture is sufficiently heated and before the member is fully heated by conduction, the coil is withdrawn and a second member at ambient temperature is inserted into the bore or aperture. The second member acts as a heat sink reducing the heat available to the outer portions of the heated member and the heated member cools and is secured to the second member with a shrink fit.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
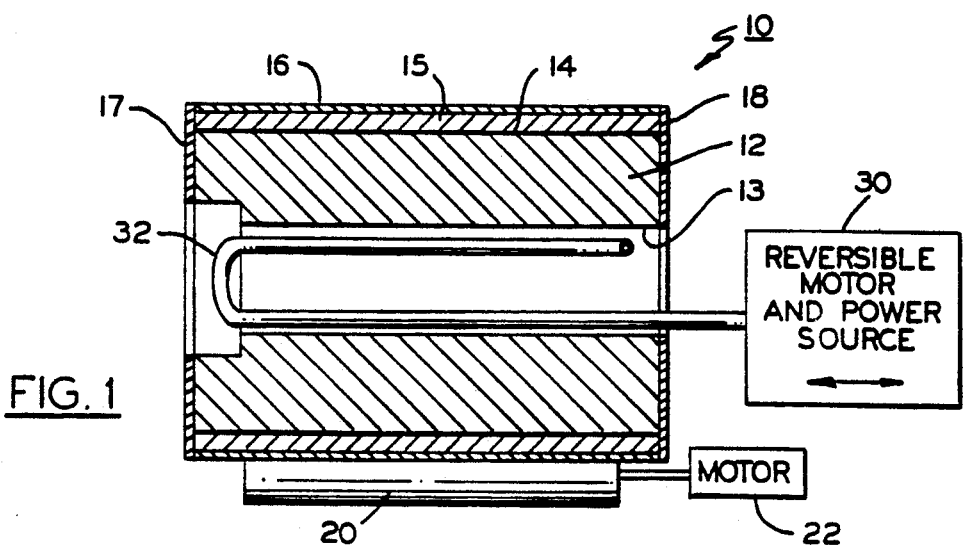
FIG. 1 is a sectional view taken along line 1—1 of FIG. 2 and showing the rotor of an ECM with an induction coil located therein.
Figure 3:
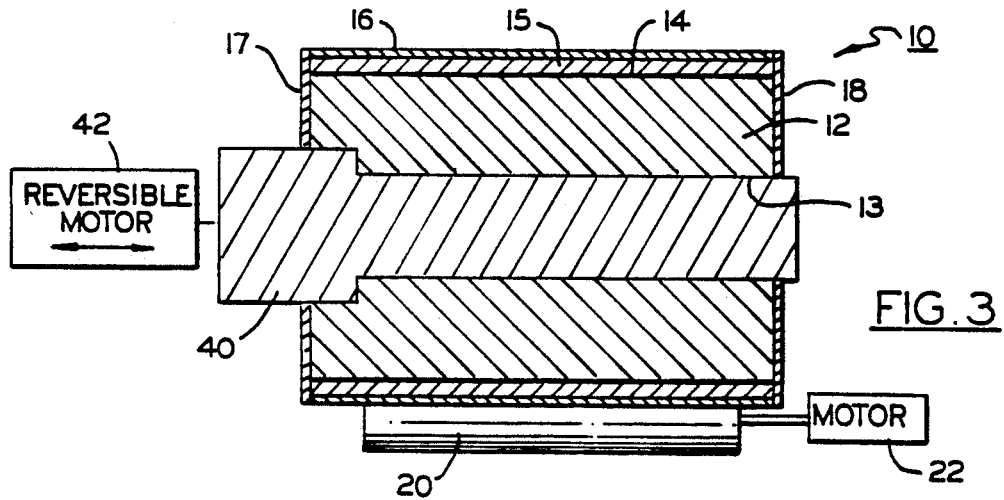
FIG. 3 a sectional view corresponding to FIG. 1 and showing the insertion of the crankshaft into the heated rotor.
Figure 2:
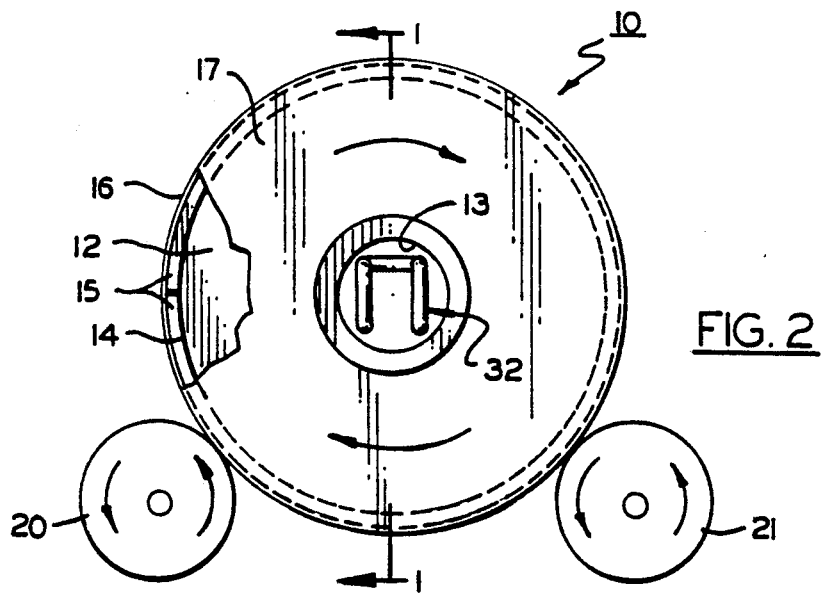
FIG. 2 is a partially cutaway end view of the rotor of an ECM showing the induction coil and motorized rollers.

In FIGS. 1-3, the numeral 10 generally designates the rotor of an ECM. Rotor 10 includes a generally cylindrical backiron member 12 having an axial bore 13 and having a plurality of thin magnetic elements or laminations 15 secured to the outer peripheral surface of the backiron 12 by an adhesive or other suitable means 14. Typically the magnetic elements or laminations are made of ferromagnetic materials such as ferrite, a ceramic material, but may also be a neodymium or other high energy magnet. Ferromagnetic elements 15 are covered by stainless steel sheath 16 and the ends of rotor 10 are covered by annular aluminum end plates 17 and 18, respectively. Referring to FIG. 2, it will be noted that rotor 10 is supported on two rollers, 20 and 21 which define a support mechanism. To avoid synchronization problems, preferably only one of the rollers is driven. Roller 20 is illustrated in FIG. 1 as being driven by motor 22. However, if necessary, or desired, both of the rollers 20 and 21 can be driven. With roller 20 driven by motor 22 and rotor 10 placed on rollers 20 and 21, the rotor 10 will be driven in the opposite direction from roller 20. Referring now to FIG. 1, reversible motor and power source 30 is capable of placing bent hairpin induction coil 32 within bore 13 and withdrawing it therefrom and for powering the coil 32 when it is within bore 13. The use of the preferred bent hairpin requires the rotating of rotor 10 with respect to coil 32 in order to provide uniform heat penetration. When rotor 10 is heated sufficiently, coil 32 is withdrawn from bore 13 and crankshaft 40 is inserted in bore 13 by reversible motor 42, as illustrated, or manually. Or, alternatively, the rotor 10 is placed on crankshaft 40.

The induction coil 32 and its power are selected such that the coil 32 is spaced from bore 13 so that uniform heat is distributed to the surface of bore 13 of rotating rotor 10. The coil 32 only provides induction heating for a portion of the radial distance originating at bore 13 by precisely regulating the frequency and power with the rest of rotor being heated only by conduction. When the bore 13 is heated so as to be dilated sufficiently, coil 32 is withdrawn from bore 13 and crankshaft 40 is quickly inserted in bore 13. The coil 32 and its power will be selected for a specific rotor. For one rotor the best results were achieved with a frequency of about 145 kilohertz and 12 kilowatts of power applied for 30 seconds. This permitted the insertion of the crankshaft 40 into bore 13 while the surface of rotor 10 as defined by sheath 16 remained cool to the touch for well past 30 seconds after the coil 32 was removed from bore 13. The temperature realized at the surface of bore 13 never reaches the magnetic elements 15 or the adhesive 14 which would be destroyed thereby.

Figure 4:
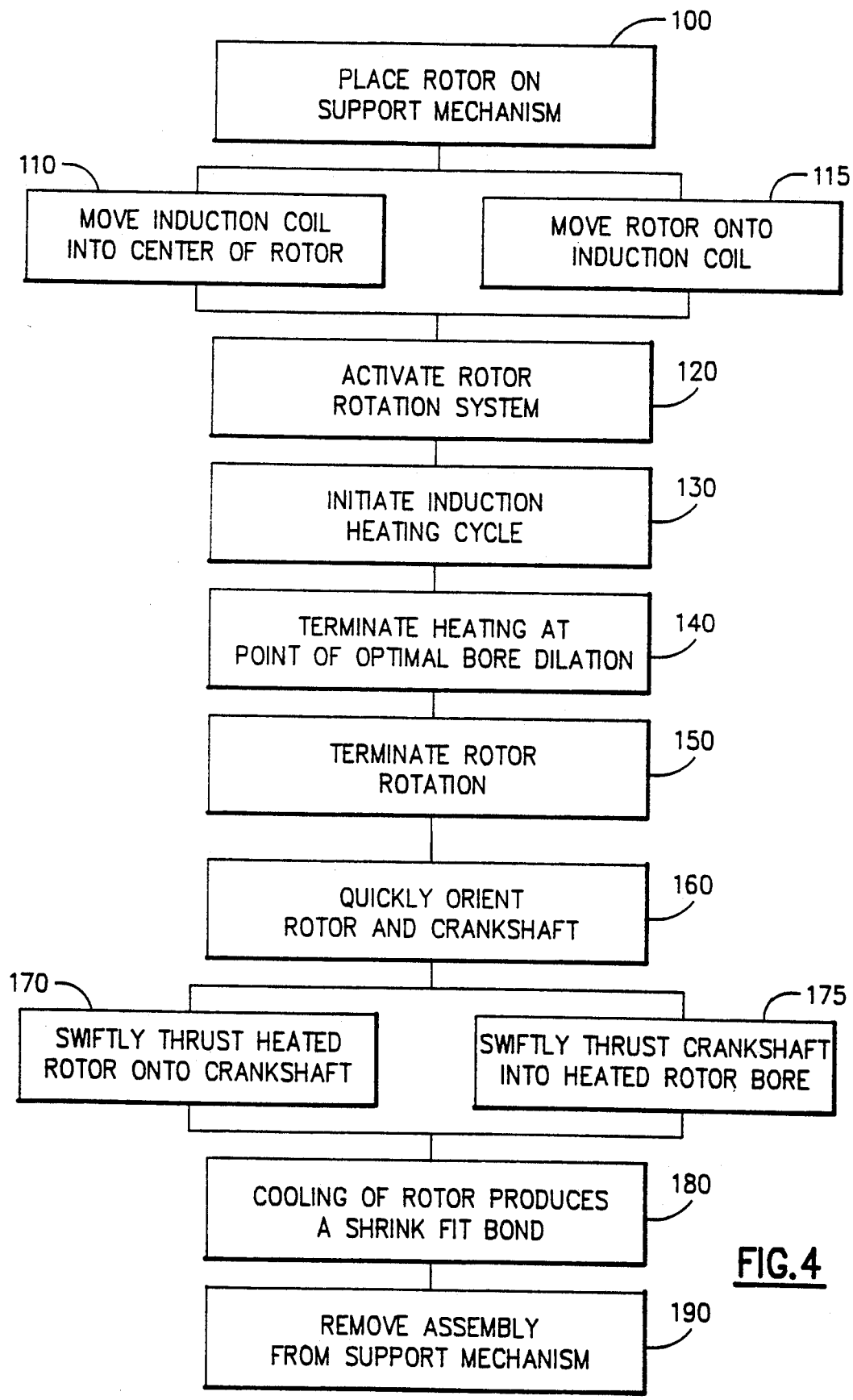
FIG. 4 is a flow diagram of the assembly process.

In operation, ECM rotor 10 is heated inductively to expand the core or backiron portion 12 allowing it to shrink fit over crankshaft 40. Specifically, as shown in FIG. 4 and indicated by block 100, rotor 10 is placed on the support mechanism defined by rollers 20 and 21. Then, either internal style bent hairpin induction coil 32 is placed in bore 13 of the rotor 10 by reversible motor 30 as indicated by block 110. Or, rotor 10 and the support mechanism are moved so that rotor 10 is moved onto induction coil 32, as indicated by block 115. Then, as indicated by block 120, motor 22 is started and rotor 10 is rotated by motor driven roller 20. Power is supplied to coil 32 as indicated by block 130 and heats rotor 10 from the inside-out. The power is supplied at high frequency and the coil 32 is designed so that the limit of heating depth can be controlled via coil design, induction power and frequencies so as to match the requirements of the rotor 10. With the interior of rotor 10 heated and bore 13 optimally enlarged as a result, the heating of bore 13 is terminated, as indicated by block 140, and motor 22 is stopped thereby stopping the rotation of rotor 10, as indicated by block 150. Then, coil 32 is withdrawn from bore 13 by motor 30 or rotor 10 is removed from coil 32. With coil 32 and rotor 10 separated, rotor 10 is quickly oriented with respect to crankshaft 40, as indicated by block 160. Then, either rotor 10 is swiftly thrust onto crankshaft 40, as indicated by block 170, or crankshaft 40 is inserted into heated rotor 10 by reversible motor 42 or manually, as indicated by block 175. When crankshaft 40, which is at ambient temperature, is placed in bore 13 of heated rotor 10 it acts as a heat sink relative to the rotor 10. Thus, the rotor 10 cools to a shrink fit on crankshaft 40, as indicated by block 180. The crankshaft and rotor assembly are then removed from the support mechanism as indicated by block 190.

The foregoing method and apparatus provides fast heating so that it supports "on demand" processing, is economical since it only heats and therefore only expands the area requiring heat, leaves the outside of rotor 10 cool to the touch permitting easy bare hand installation of the rotor 10 onto crankshaft 40, does not cause loss of magnetic properties of the magnets 15, eliminates exceeding the maximum temperature of adhesive 14, does not cause destruction of the magnetic material because of the absence of thermal shock and essentially eliminates thermal stress because heat conduction takes place with respect to the crankshaft which is acting as a heat sink as well as flowing to the outside surface of the core 12.

Although the invention has been illustrated and described with the rotor remaining in position while the coil is inserted and withdrawn followed by the insertion of the crankshaft. The rotor could be placed over the coil 32 and onto the crankshaft 40. The steps may be done mechanically, as described, or by hand. If done mechanically, the removal of the coil 32 and the insertion of crankshaft 40 can be timed to be essentially concurrently to have the bore 13 as dilated as possible while permitting the heat sink effect of crankshaft 40 to take place as soon as possible. Further, although the description is specific to an ECM rotor it can be used to attach other members in a shrink fit where the loss of magnetic properties is not a factor but the reduced power requirements, bare hand manipulation, etc. can be of advantage. Thus, although a preferred embodiment of the present invention have been illustrated and described it is applicable to other uses. It is, therefore, intended that the present invention is to be limited only by the scope of the appended claims.

What is claimed is:

1. Apparatus for securing two members in a shrink fit wherein a first one of said two members has an opening therein and a second one of said two members has a portion adapted to be located in said opening whereby said first and second members are secured together n a shrink fit comprising:
   means to be located in said opening for providing localized heating to said first member;
   means for separating said first member and said means for providing localized heating;
   means for locating said portion of said second member at ambient temperature in said opening of said first member while said first member is heated locally whereby said second member acts as a heat sink relative to said first member and said first member heat shrinks onto said second member.

2. The apparatus of claim 1 wherein said means to be located in said opening for providing localized heating is an induction coil.

3. The apparatus of claim 1 wherein said first member is generally cylindrical and further includes means for rotating said first member to provide a uniform localized heating of said first member by said means for providing localized heating.

4. The apparatus of claim 3 wherein said means for providing localized heating is an induction coil.

5. Apparatus for securing a crankshaft and rotor for an CM by a shrink fit wherein said rotor has an axial bore located therein and an outer portion having magnetic members secured thereto comprising:
   means to be located in said bore for providing localized heating to said rotor;
   means for separating said rotor and said means for heating;
   means for locating said crankshaft in said bore while said rotor is heated locally whereby said crankshaft acts as a heat sink relative to said rotor and said rotor shrink fits onto said crankshaft.

* * * * *